United States Patent
Huang et al.

(10) Patent No.: US 7,654,425 B2
(45) Date of Patent: Feb. 2, 2010

(54) ADJUSTABLE DASHBOARD-MOUNTED CAMERA MOUNT

(75) Inventors: Ritchie Huang, Torrance, CA (US); David Kirsch, San Pedro, CA (US)

(73) Assignee: Honda Motor Co., Ltd., Tokyo (JP)

( * ) Notice: Subject to any disclaimer, the term of this patent is extended or adjusted under 35 U.S.C. 154(b) by 702 days.

(21) Appl. No.: 11/554,938

(22) Filed: Oct. 31, 2006

(65) Prior Publication Data
US 2008/0099521 A1    May 1, 2008

(51) Int. Cl.
*B60R 7/06* (2006.01)
*B64D 47/08* (2006.01)

(52) U.S. Cl. .................. 224/483; 224/559; 224/550; 224/908

(58) Field of Classification Search .................. 224/483, 224/559–561, 585, 908, 929; 248/65, 70, 248/72, 214, 683
See application file for complete search history.

(56) References Cited

U.S. PATENT DOCUMENTS

| | | | |
|---|---|---|---|
| 2,250,442 A | 7/1941 | Abell | |
| 3,104,895 A * | 9/1963 | Feuerbach et al. | 248/455 |
| 3,176,602 A | 4/1965 | Wilt | |
| 4,108,342 A * | 8/1978 | Riva | 224/484 |
| 4,836,482 A | 6/1989 | Sokol | |
| 4,863,130 A | 9/1989 | Marks, Jr. | |
| 4,933,691 A | 6/1990 | Leslie | |
| 5,035,460 A * | 7/1991 | Huang | 296/95.1 |
| 5,137,238 A * | 8/1992 | Hutten | 248/206.3 |
| 5,246,193 A | 9/1993 | Faidley | |
| 6,095,060 A * | 8/2000 | Ma | 108/45 |
| 2005/0045684 A1* | 3/2005 | Ouyang | 224/585 |

* cited by examiner

*Primary Examiner*—Nathan J Newhouse
*Assistant Examiner*—Adam Waggenspack
(74) *Attorney, Agent, or Firm*—Mark E. Duell; Rankin, Hill & Clark LLP

(57) ABSTRACT

A mounting assembly for mounting a camera to a vehicle dashboard, the assembly having a low-profile base plate, adjustable feet extending between the base plate and the dashboard, hooks that extend around a rearwardly facing edge of the dashboard, a suction mount that is releasably attached to the vehicle windshield, and adjustable tensioning cables that attach the base plate to the suction mount. The mounting assembly permits one or more cameras to be stably secured to the dashboard at a desired location without damaging the dashboard.

18 Claims, 2 Drawing Sheets

ADJUSTABLE DASHBOARD-MOUNTED CAMERA MOUNT

BACKGROUND OF THE INVENTION

1. Field of the Invention

The present invention relates to an apparatus for mounting cameras to a vehicle, and, more particularly, to an apparatus for temporarily mounting cameras to a dashboard.

2. Description of Related Art

Cameras may be mounted on vehicle dashboards for testing or observation purposes. Sometimes two cameras are mounted on a dashboard facing the driver so as to enable the creation of stereo images of the driver's face or eyes. 3-D or steroscopic imagery involves the use of two images of the same scene taken from slightly different angles in order to create a sense of depth in the resulting image. The use of two spaced-apart cameras to take images (still or video) allows dimensional calculations to be made and therefore is useful in performing tests or taking measurements. Some dash-mounted dual cameras are used as eye or face recognition devices.

There are several types of devices and methods for mounting cameras to vehicle dashboards. Some cameras are coupled to the dashboard by physically bonding a camera mount to the dashboard with adhesives, such as double-sided adhesive tape or strips of hook-and-loop fabric fasteners. Such hook-and-loop fabric fastener strips must also be adhesively secured to the camera mount and the dashboard. Some of these mounts may leave behind hard-to-remove residue. Some camera mounts are simply fastened to the dashboard using mechanical fasteners such as screws or bolts. When many of these types of mounts are removed from the dashboard, they leave permanent and unsightly holes or marks on the dashboard. In any event, known camera mounts are inconvenient and may cause costly damage to the vehicle, which is a problem particularly when the cameras only need to be temporarily mounted in the vehicles for testing purposes.

Camera mounts are difficult to place on the dashboard because there are few places to easily fasten the mounts. Also, the mounts need to be shaped and placed so as to avoid blocking the view of a person in the driver's seat of the vehicle. Moreover, many mounts need to be able to adapt to a wide variety of vehicles, and must be secure and stable.

U.S. Pat. No. 5,137,238 to Hutten describes a camera mounting device including two suction cups that attach to any smooth surface, such as a windshield in a vehicle. The device is leveled by the adjustment of a knurled nut which adjusts the distance between a support disk and base of the device. The support disk may rest upon a vehicle surface, such as the dashboard.

U.S. Pat. No. 5,246,193 to Faidley describes a mobile camera mount including two suction cups that attach to a vehicle windshield. The suction cups are part of a U-shaped framework that supports a camera. An optional brace with an end having an additional suction cup or pad also attaches to the framework and abuts the windshield to provide additional support.

U.S. Pat. No. 3,176,602 to Wilt describes a dashboard mount for a movie camera. The mount utilizes a suction cup that is affixed adjacent to the edge of the dashboard. The mount also includes an arm that extends from the suction cup toward the vehicle's windshield.

Accordingly, there exists a need in the art for a camera mount that is adjustable to fit a variety of vehicle types, that is easy to install and remove, and that does not damage or mar the vehicle dashboard.

SUMMARY OF THE INVENTION

The present invention is directed toward a removable camera-mounting assembly for a vehicle, the assembly having a low-profile base plate, adjustable feet, hooks for hooking around the dashboard of the vehicle, a suction cup that is releasably attached to the inside of the vehicle windshield, and adjustable tensioning cable assemblies. The underside of the base plate contacts the dashboard at least one point, and the feet of the assembly contact the dashboard. Embodiments of the assembly may be useful for holding plural cameras to provide stereo images in testing situations wherein eye or face recognition of a person in the driver's seat is necessary.

The camera-mounting assembly of the present invention is quick and easy to install and remove. It is also lightweight, simple to manufacture, and readily adapts to different vehicles. Moreover, the present invention does not damage or leave residue on the vehicle dashboard.

BRIEF DESCRIPTION OF THE DRAWINGS

These and further features of the invention will be apparent with reference to the following description and drawings, wherein.

DETAILED DESCRIPTION OF THE PREFERRED EMBODIMENTS

Figure 1:
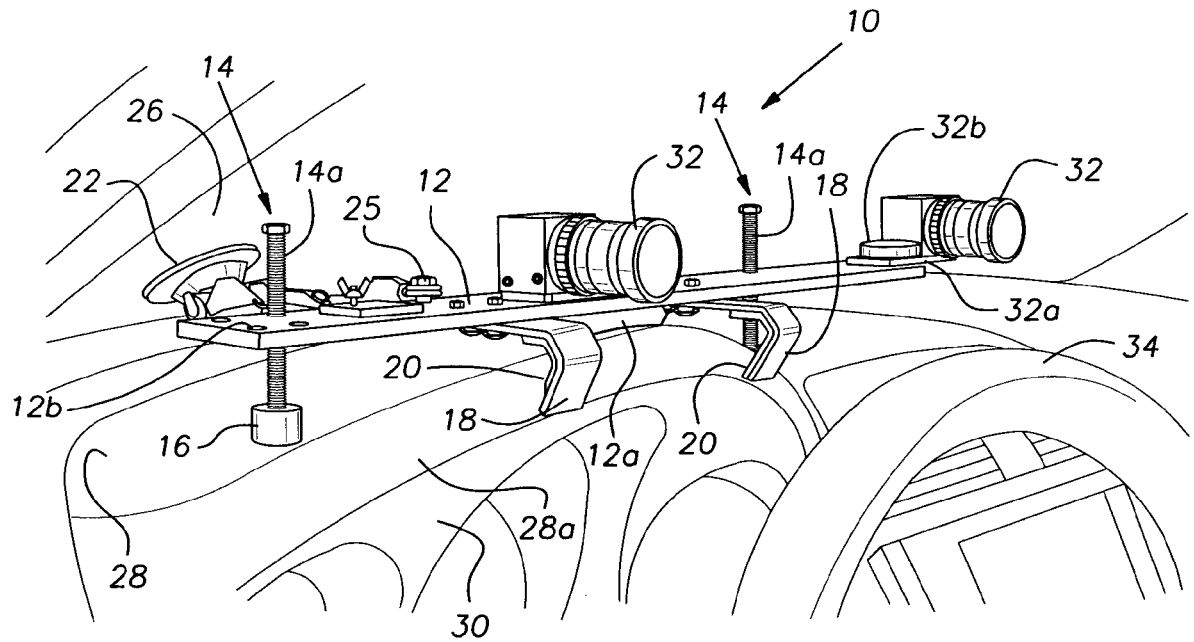
FIG. 1 is a perspective view of a camera-mounting assembly in accordance with one embodiment of the present invention, the assembly being shown during mounting to a dashboard of an vehicle.
Figure 2:
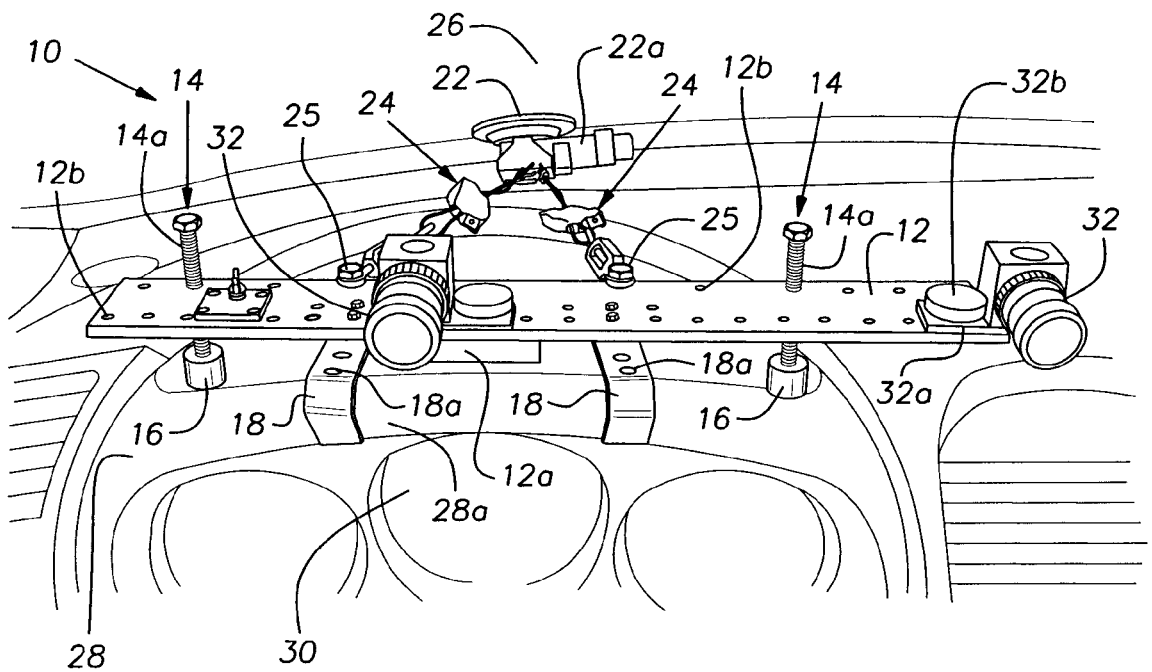
FIG. 2 is another perspective view of the camera-mounting assembly, with the assembly being mounted to the vehicle dashboard.
Figure 3:
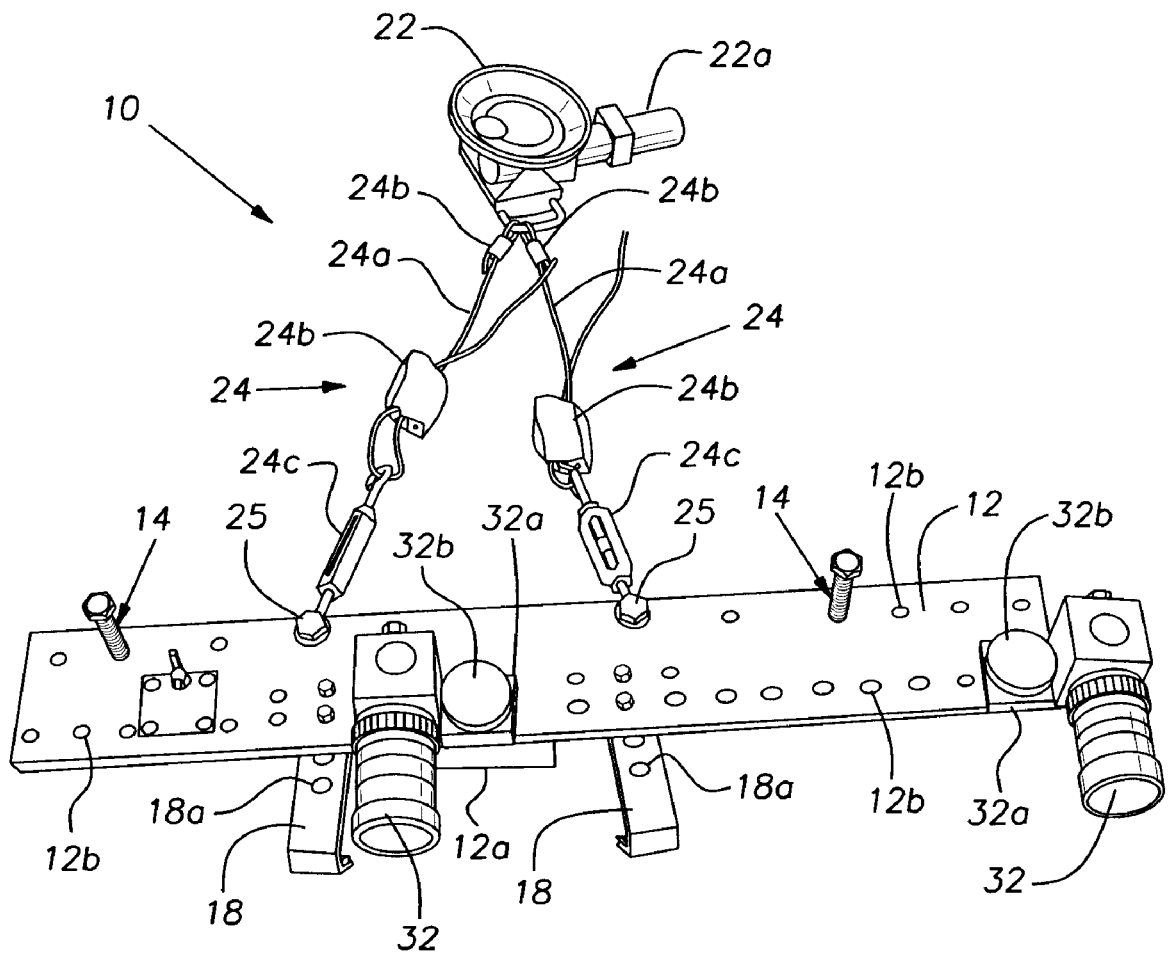
FIG. 3 is a top view of the camera-mounting assembly.

FIGS. 1 through 3 show a camera mounting assembly 10, which, according to the present invention, is designed to be placed on a vehicle dashboard 28. The assembly 10 includes a base plate 12, adjustable feet 14, adjustable hooks 18, a suction mount 22, and cable tensioning assemblies 24. Cameras 32 are mounted on the base plate 12. In the preferred embodiments of the present invention, two cameras 32 are mounted on the base plate 12 so as to enable the taking of images in stereo. However, it is contemplated that any number of cameras 32 may be coupled to the base plate 12, and that the cameras may be still cameras and/or video cameras. Preferably, and as described hereinafter, the cameras 32 include an adjustable mount 32a whereby at least the orientation of the cameras 32 about a vertical axis may be easily adjusted and then locked in place.

The base plate 12 serves as a camera mounting surface that can be coupled to the vehicle dashboard 28. Preferably, the base plate 12 is substantially flat and elongated so as to be suitable for placement on top of the dashboard 28. However, the base plate 12 can be any shape and size suitable for mounting a camera 32 thereon. The base plate 12 should have a low profile, however, so as to avoid blocking the driver's line of sight.

The base plate 12 is formed from a relatively stiff and durable material including, but not limited to, metal, wood, or plastic. Also, in the preferred embodiments of the present invention, the base plate 12 is formed from a single or unitary piece of metal, such as aluminum or steel, but may be formed from multiple pieces that are coupled together. The base plate 12 has a series of mounting holes 12b formed therein, as illustrated. Preferably the mounting holes 12b are tapped or threaded and thereby adapted to receive threaded fasteners for attachment of the feet 14, mounts for the cameras 32, and connections to the cable tensioning assemblies 24. Further, a lower surface of the base plate 12, which faces toward the top surface of the dashboard 28, includes a padded or foam-like cushion 12a. The cushion 12a engages the dashboard 28 and supports the base plate 12 thereon. Preferably, the cushion 12a is disposed between the hooks 14 at a rear of the base plate, as illustrated, and cooperates with the feet 14 to provide a stable, three-point support for the base plate 12, as describe hereinafter.

Each of the adjustable feet 14 include a threaded bolt 14a that is screwed into any of the mounting holes 12b extending through the base plate 12. In the illustrated embodiment, the feet 14 (bolts) include a conventional hex head, which may be engaged and driven by a socket or wrench. However, it is contemplated that the feet may be rotated by hand and/or that a knob or similar attachment may be formed on the upper end of the feet 14, or attached over the hex head at upper end of the feet 14, so as to facilitate hand-threading of the feet 14. Preferably, the adjustable feet 14 are secured to the front side of the base plate 12 (i.e., the side furthest away from the steering wheel 34) so as to allow the front side of the base plate 12 to be adjusted vertically relative to the fixed rear side of the base plate and thereby allow a user to adjust the angle of the cameras 32 mounted on the base plate 12.

In the preferred embodiments of the present invention, the assembly 10 has two feet 14, but other embodiments may have one foot or more than two feet 14. Each of the adjustable feet 14 also further comprises a cushioned end cap 16 that is adapted to engage the dashboard 28 and minimize damage to the dashboard 28. Preferably, the end cap 16 is made of some type of rubber or foam, but it can be made of any relatively soft or resilient material that would help minimize damage to the dashboard 28. The cushioned end cap 16 is secured to and covers the bottom of the feet 14, and may cover additional areas of the feet 14, if desired. The end caps 16 are removably secured to the feet 14, and are removed to permit withdrawal and repositioning of the feet 14.

The hooks 18 are shaped to allow a user to fit them over an edge on the dashboard 28, preferably at the edge 28a of the dashboard 28 closest to the steering wheel 34, as shown in FIGS. 1 and 2. In the preferred and illustrated embodiment, the hooks 18 extend over a rearward facing edge 28a of the dashboard 28 that lies above the instrument panel 30 and directly in front of the steering wheel 34. The hooks 18 may be fixed to the base plate 12 by any appropriate means, including but not limited to mechanical fasteners such as screws, bolts, and adhesives.

Preferably, the hooks 18 have an elongated body with a series of adjustment holes 18a formed therein. The adjustment holes 18a permit the hooks 18 to be repositioned so as to change an amount that the hooks 18 project or extend from the base plate 12. The holes 18a in each hook body are aligned with associated mounting holes 12b in the base plate 12. Fasteners, such as bolts, are inserted through the aligned holes 18a, 12b to secure the hooks 18 to the base plate 12 at the desired extension amount. Adjusting the amount the hooks 18 extend from the base plate 12 permits the assembly 10 to fit onto different dashboards 28, especially dashboards having different depths. The hooks 18 preferably include padding 20 (FIG. 1) on their underside (i.e., the side that engages the dashboard edge 28a) so as to minimize damage to the dashboard 28. Preferably, the assembly 10 has two hooks 18, but it is contemplated that the assembly 10 may have only one hook, or more than two hooks 18.

The suction mount 22 releasably secures to the inside of the vehicle windshield 26 and helps hold the assembly 10 in place. The suction mount 22 provides an anchor point for the assembly 10, preferably at the base of the windshield 26. One or more suction mounts 22 may be used to anchor the assembly 10, but in the illustrated and preferred embodiment, only one suction mount 22 is used. Although the term 'suction mount' is used herein, it is considered apparent that any type of mount may be used. For example, a relatively active vacuum cup 22 with an actuator 22a is illustrated herein, but may be replaced by a conventional, or passive, suction cup, if desired. Further, although not preferred, it is contemplated an adhesive-type mount may also be used in place of a suction-type mount, with it being recognized that adhesive residue that may remain on the windshield will have to be cleaned.

Two adjustable cable assemblies 24 extend from the base plate 12 to the suction mount 22. Each cable assembly includes a cable 24a, a pair of cable clamps 24b, and a turnbuckle 24c. One end of each of the cables 24 is looped around a mounting ring provided by the turnbuckle 24c, and held in place by a one cable clamp 24b. The other end of each cable is looped around a mounting base of the suction mount 22, and is held in place by the other cable clamp 24b. The turnbuckle 24c extends between the cable 24a and the base plate 12, and is affixed to the base plate by a suitable coupling means, such as a bolt 25 inserted through a turnbuckle mounting ring and threaded into a base plate mounting hole 12b.

Although the turnbuckle 24c is shown and preferred as the cable tensioning device, it is considered apparent that the turnbuckle 24c may be replaced by other tensioning devices known in the art. Although the preferred embodiments have two sets of cables 24, other embodiments of the assembly 10 may have one cable or more than two cables 24, as desired. Further, although simple cable clamps 24b are illustrated, it is contemplated that ratchet-type cable clamps may be employed, including releasable ratchet-type cable clamps, so as to facilitate tightening of the cables prior to or subsequent to adjustment of the tensioning assembly (i.e., turnbuckle). It is further contemplated that a ratcheting-type tie down strap may be used as the entire cable tensioning assembly 24, if desired.

Cameras 32 or other equipment may be adjustably secured to the base plate 12 at any of a plurality of locations. Available mounting locations are defined by the holes 12b formed in the base plate 12. The cameras 32 include mounts whereby the orientation of the cameras about a vertical axis (i.e., an axis extending through the mounting hole 12b) may be adjusted. In the illustrated embodiment, the mount is simply a plate-like support 32a that is rotatably adjustable relative to the base plate 12 and releasably affixed in the desired orientation by a clamp device 32b. The clamp device 32b threadably extends through the associated base plate mounting hole 12b, and includes an enlarged knob or handle that the user rotates. As will be appreciated, rotating the knob in one direction releases the clamp device 32b from the plate-like support 32a, and thereby permits the plate-like support 32a to be re-oriented relative to the base plate 12. Rotating the knob in the opposite direction tightens the clamp device 32b, and clampingly secures the plate-like support 32a to the base plate 12, and thereby retains the plate-like support 32a and the camera 32 mounted thereon in the desired orientation. Two cameras 32 spaced apart from each other on the base plate 12 may be useful for providing stereoscopic images, as may be desired.

In use, the assembly 10 of the present invention is placed on top of a dashboard 28 so that the hooks 18 extend over the rear edge 28a of the dashboard 28 and the end caps 16 at the bottom ends of the feet 14 rest on the top surface of the dashboard 28. The base plate 12 is supported on the dashboard top surface by the feet 14 and the cushion 12*a*, which cooperate to provide a stable three-point support. The suction mount 22 is then secured to the windshield 26, and the cable assemblies 24 are tightened or tensioned by manipulation of the tensioning devices (e.g., turnbuckles 24*c*) so as to draw the assembly 10 forwardly toward the windshield 26 such that the hooks 18 are firmly engaged with or around the rear edge 28*a* of the dashboard 28. At this point the assembly 10 is securely mounted to the dashboard 28.

Thereafter, it may be necessary to adjust the cameras 32 such that the desired image is provided. To this end, the adjustable feet 14 are turned in or out so as to place the base plate 12, and the cameras 32 thereon, at the desired angle or tilt. Also, the camera mounts 32*a* are rotatably adjusted, as describe hereinbefore, to point the cameras 32 in the desired direction. Accordingly, the assembly of the present invention provides for a wide range of camera adjustment.

Cameras 32 may be coupled on top of the base plate 12 either before or after the assembly 10 is placed on the dashboard 28. A real or artificial person may then sit in the driver's seat while the vehicle moves and the cameras 32 provide stereo images of that person's face and/or eyes. Afterwards, the assembly 10 may be removed by loosening the cable assemblies 24 via the turnbuckles 32*c*, removing the suction mount 22, sliding the assembly 10 rearwardly to free the hooks 18 from the dashboard edge 28*a*, and lifting the assembly 10 off of the dashboard 28. Installation and removal of the assembly 10 is quick and easy, and does not cause unsightly damage to the dashboard 28. The assembly 10 also does not leave hard-to-remove adhesive residue on the dashboard 28.

The present invention provides a simple and reliable method and assembly 10 for adjustably mounting one or more cameras 32 to a vehicle dashboard 28 in a manner that does not damage the dashboard 28. Further, the assembly 10 may be installed, adjusted, and removed in a simple manner, which places little burden on the user. It is considered apparent that the assembly 10, due to its adjustability, may be considered a universal camera mount in that it may be used with equal functionality in virtually any commercial vehicle, regardless of the vehicle's dashboard geometry.

While the preferred embodiments of present invention have been described herein with particularly, it is noted that the invention is capable of numerous modifications, rearrangements, and substitutions of parts without departing from the scope and spirit of the present invention. Accordingly, the invention is not limited to the particular structures described herein, but rather is only to be defined by the claims appended hereto.

What is claimed is:

1. A removable camera-mounting assembly for use in a vehicle, the assembly comprising:
    a base plate for placement on top of a dashboard of said vehicle;
    feet adjustably secured to the base plate, the bottom of the feet being adapted to rest on top of said dashboard;
    hooks extending from a rear of the base plate, the hooks being shaped to extend over a rearward facing edge of the dashboard;
    a mount that is releasably attached to an inside surface of a windshield of the vehicle; and
    a cable assembly extending between the base plate and the mount, said cable assembly being adapted to draw the base plate toward the windshield so as to maintain the hooks in engagement with the rearward facing edge of the dashboard.

2. The assembly according to claim 1, wherein the feet are disposed on a forward side of said base plate.

3. The assembly according to claim 2, wherein an amount said plurality of feet extend from said base plate is adjustable so as to vary an angle of said base plate.

4. The assembly according to claim 1, wherein each of said plurality of hooks includes a surface facing said rearward facing edge of the dashboard, and wherein the hook surface is padded.

5. The assembly according to claim 1, wherein said cable assembly includes a cable and a cable tensioning device.

6. The assembly according to claim 1, wherein said base plate has a plurality of openings formed therein, each of said plurality of openings being adapted to serve as a camera mount.

7. The assembly according to claim 3, wherein each of said plurality of hooks includes a surface facing said rearward facing edge of the dashboard, and wherein the hook surface is padded.

8. The assembly according to claim 7, wherein said cable assembly includes a cable and a cable tensioning device.

9. The assembly according to claim 8, wherein said base plate has a plurality of openings formed therein, each of said plurality of openings being adapted to serve as a camera mount.

10. A camera-mounting assembly for temporary placement on a dashboard of a vehicle, the assembly comprising:
    a substantially flat and elongated base plate that rests on said dashboard;
    adjustable feet coupled to the base plate, wherein a lower end of said feet rest on the dashboard and wherein an amount said feet extend from said base plate is adjustable;
    padded hooks extending from a rear of the base plate, said hooks being shaped to extend over a rearward facing edge of the dashboard;
    a suction mount that is releasably attached to an inside surface of a windshield of said vehicle; and
    a cable assembly that connects the suction mount to the base plate.

11. The assembly according to claim 10, wherein a camera is adjustably secured to a top of said base plate.

12. The assembly according to claim 10, wherein the feet are coupled to the base plate at a front of the base plate.

13. The assembly according to claim 10, wherein a cushion is attached to a bottom of the base plate.

14. The assembly according to claim 13, wherein the cushion is disposed at the rear of the base plate.

15. The assembly according to claim 14, wherein the cushion is disposed between the hooks, and wherein the cushion cooperates with the feet to provide a three-point support for the base plate.

16. The assembly according to claim 15, where the hooks are adjustably secured to the base plate such that an amount the hooks extend rearwardly from the base plate is adjustable.

17. The assembly according to claim 14, wherein the feet are coupled to the base plate at a front of the base plate.

18. The assembly according to claim 17, wherein a camera is adjustably secured to a top of said base plate.

\* \* \* \* \*